United States Patent [19]

Pappas

[11] Patent Number: 4,832,442
[45] Date of Patent: May 23, 1989

[54] METHOD AND APPARATUS FOR AERIAL INSTALLATION OF FIBER OPTIC CABLES

[75] Inventor: Vincent J. Pappas, Lansdale, Pa.

[73] Assignee: United Ropeworks (U.S.A.) Inc., Montgomeryville, Pa.

[21] Appl. No.: 74,735

[22] Filed: Jul. 17, 1987

[51] Int. Cl.$^4$ .................. G02B 6/44; H02G 3/00; D02G 3/36; E21F 17/02

[52] U.S. Cl. ....................... 350/96.23; 350/96.10; 350/320; 174/40 R; 174/41; 174/45 R; 174/70 R; 57/1 UN; 57/14; 242/7.02; 248/61

[58] Field of Search .............. 350/96.10, 96.23, 320; 174/40 R, 41, 43, 45 R, 70 R, 70 A; 248/58, 61; 57/1 R, 1 UN, 5, 14, 362; 242/1, 7.01, 7.02, 174 R, 174 A

[56] References Cited

U.S. PATENT DOCUMENTS

| | | | |
|---|---|---|---|
| 292,847 | 2/1884 | Patterson | 174/70 A |
| 2,473,965 | 1/1947 | Morrison et al. | 174/70 |
| 2,870,237 | 1/1959 | Wilkins et al. | 174/41 |
| 3,474,183 | 10/1969 | Kelly, Jr. et al. | 174/41 |
| 3,750,058 | 7/1973 | Bankert, Jr. et al. | 350/96.23 X |
| 3,955,878 | 5/1976 | Nowak | 350/96.23 |
| 4,028,081 | 6/1977 | Marcatili | 350/96.23 |
| 4,039,248 | 8/1977 | Franke et al. | 350/96.23 |

(List continued on next page.)

FOREIGN PATENT DOCUMENTS

| | | | |
|---|---|---|---|
| 197457 | 4/1958 | Fed. Rep. of Germany | 174/41 |
| 3316898 | 11/1984 | Fed. Rep. of Germany | 350/96.23 |
| 53-10885 | 1/1978 | Japan | 174/41 |
| 58-82208 | 5/1983 | Japan | 350/96.23 |
| 58-105109 | 6/1983 | Japan | 350/96.23 |
| 58-139104 | 8/1983 | Japan | 350/96.23 |
| 60-50505 | 3/1985 | Japan | 350/96.23 |
| 61-17104 | 1/1986 | Japan | 350/96.23 |
| 61-29811 | 2/1986 | Japan | 350/96.23 |
| 61-226705 | 10/1986 | Japan | 350/96.10 |

OTHER PUBLICATIONS

Oestreich et al., "Fiber Optic Cable for Aerial Application", Pro. of the Int. Wire and Cable Sym., Cherry Hill, N.J., 11/80, pp. 394–401.

E. Hayasaka, et al., "Non-Metallic Optical Cable with Optical Fiber Catenary for Long Span Aerial Application", *International Wire & Cable Symposium Proceedings 1983*, pp. 155–166.

E. Hayasaka, et al., "The Clarification of Movement of Non-Metallic Self-Supporting Optical Cable Caused by Wind and the Design of Its Installation at Steel Pylons", *International Wire & Cable Symposium Proceedings 1984*, pp. 365–371.

Sumitomo Electric Industries, Ltd. "Outline of SPOF Cable and Related Technology", 10/3/85, No. TR-85097, 10 pages.

Sumitomo Electric Industries, Ltd. "Specification for Self-Supporting Non-Metallic Optical Fiber Cable", 5/21/86, Spec. No. 6HJ-7282A, Sheet Nos. 1/9 through 9/9.

Wong et al., "Pre-Stranded Self Supporting Aerial Cable Design", Int. Wire and Cable Sym. 1987, pp. 438–440.

*Primary Examiner*—William L. Sikes
*Assistant Examiner*—Brian M. Healy
*Attorney, Agent, or Firm*—Panitch Schwarze Jacobs and Nadel

[57] ABSTRACT

A long-distance transmission fiber optic cable system suitable for outdoor aerial installation includes a continuous length of non-metallic messenger cable with an aramid fiber, tension load bearing core and a predetermined tension load bearing strength and a polymer outer jacket adapted for outdoor exposure and a continuous length of fiber optic cable, longer than the continuous length of non-metallic messenger cable and including a plurality of fiber optic waveguides within an outer polymer jacket adapted for outdoor exposure and having a tension load bearing strength less than the predetermined tension load bearing strength, and preferably non-metallic, helically wound around the continuous length of the non-metallic cable so as to permit free axial movement. Continuous lengths of 40,000 feet or more of the preferred non-metallic messenger cable and fiber optic cables suitable for outdoor use have been made. The cable system may be hung with electric power transmission lines, and may be used to span gaps of more than one half mile.

31 Claims, 2 Drawing Sheets

U.S. PATENT DOCUMENTS

| | | | |
|---|---|---|---|
| 4,097,119 | 6/1978 | Kumamaru et al. | 350/96.23 |
| 4,146,302 | 3/1979 | Jachimowicz | 350/96.23 |
| 4,147,406 | 4/1979 | Anderson | 350/96.23 |
| 4,154,049 | 5/1979 | King et al. | 57/9 |
| 4,199,224 | 4/1980 | Oestreich | 350/96.23 |
| 4,205,899 | 6/1980 | King et al. | 350/96.23 |
| 4,227,770 | 10/1980 | Gunn | 350/96.23 |
| 4,248,035 | 2/1981 | Skillen et al. | 350/96.23 |
| 4,341,440 | 7/1982 | Trezeguet et al. | 350/96.23 |
| 4,361,381 | 11/1982 | Williams | 350/96.23 |
| 4,365,865 | 12/1982 | Stiles | 350/96.23 |
| 4,374,608 | 2/1983 | Anderson | 350/96.23 |
| 4,375,313 | 3/1983 | Anderson et al. | 350/96.23 |
| 4,375,314 | 3/1983 | Sakuragi et al. | 350/96.23 |
| 4,379,614 | 4/1983 | Liertz | 350/96.21 X |
| 4,381,140 | 4/1983 | van der Hoek et al. | 350/96.23 |
| 4,388,800 | 6/1983 | Trezeguet et al. | 350/96.23 X |
| 4,389,088 | 6/1983 | Trezeguet | 350/96.23 |
| 4,408,828 | 10/1983 | Le Noane et al. | 350/96.23 |
| 4,422,889 | 12/1983 | Trezeguet et al. | 156/70 |
| 4,468,088 | 8/1984 | van der Hoek | 350/96.23 |
| 4,474,426 | 10/1984 | Yataki | 350/96.23 |
| 4,662,712 | 5/1987 | Tabata et al. | 350/96.23 |
| 4,759,602 | 7/1988 | Pascher | 350/96.23 |
| 4,763,983 | 8/1988 | Keith | 350/96.23 |
| 4,772,090 | 9/1988 | Atkins et al. | 350/96.23 |
| 4,776,665 | 10/1988 | Oestreich | 350/96.23 |
| 4,778,246 | 10/1988 | Carroll | 350/96.23 |

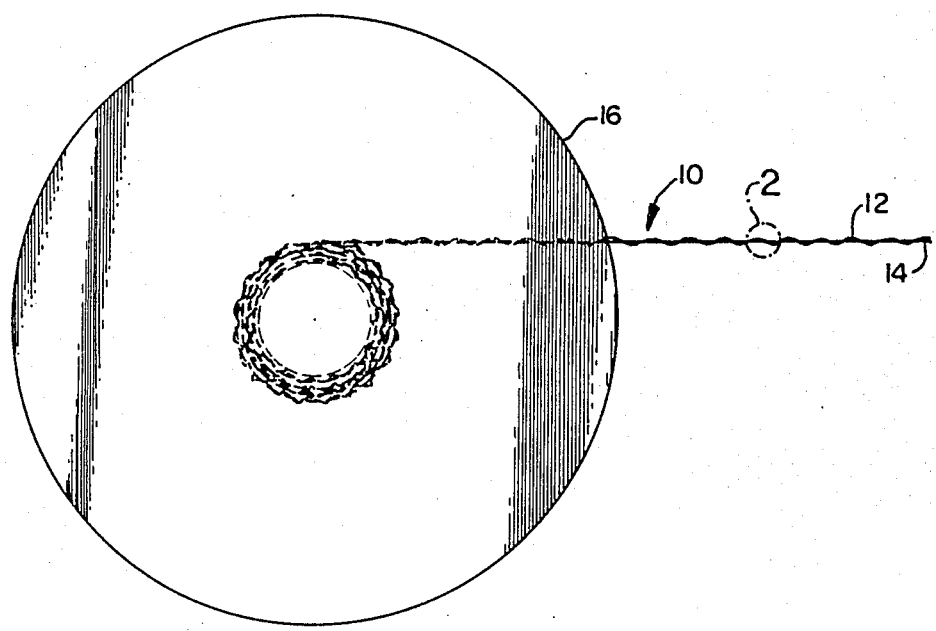
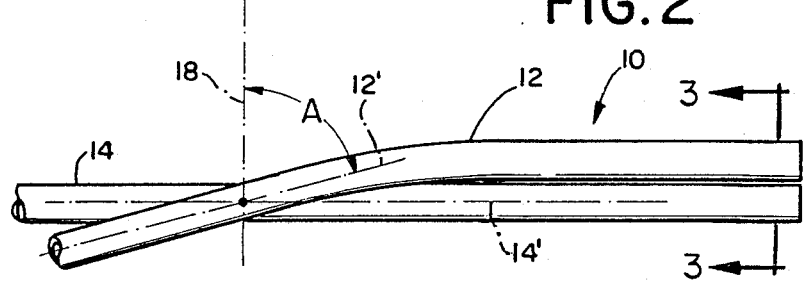
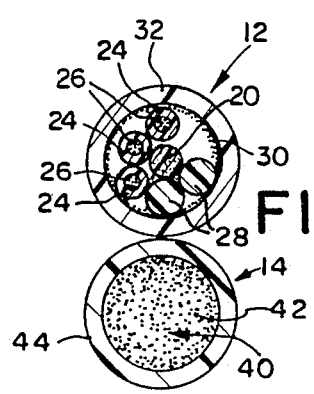

METHOD AND APPARATUS FOR AERIAL INSTALLATION OF FIBER OPTIC CABLES

BACKGROUND OF THE INVENTION

The invention relates to fiber optic cables and, in particular, to the aerial installation of fiber optic cables and cable systems for such installations.

BACKGROUND OF THE INVENTION

The typical method of aerial installation of fiber optic cable, particularly for long distance transmission, includes supporting the fiber optic cable from a steel messenger cable. This type of installation has numerous drawbacks and can create serious potential problems.

Supporting fiber optic cables with metallic messenger cables on poles or towers also supporting high voltage power transmission lines raises special problems. Fault currents can be generated in metallic messenger cables by high voltage lines strung from the same supports. These currents can heat metallic messenger cables sufficiently to melt the outer protective plastic covering typically provided as fiber optic cables. Consequently the steel messenger cables would have to be well insulated or separate supports erected for use with the metallic messenger cable. The erection of support poles is a significant expense, particularly where long distance transmission lines are involved. Insulation of metallic messenger cables is less expensive but still significantly expensive if the metallic messenger cable were thoroughly insulated by means of a dielectric covering and the use of insulated hangers attaching the metallic messenger cables to the supports. The ability to use existing power transmission poles or towers and uninsulated cable mounting hardware would therefore be of significant value in terms of both expense and time saving in installing fiber optic cables over long distances.

Where existing towers or other supports are not available, it would also be of value to increase the spacing between adjoining supports beyond that achievable with metallic messenger cables to minimize the number of supports needed.

It would also be advantageous to be able to span distances between supports which are greater than the distances which can be spanned with metallic messenger cables. It is believed that the maximum span distance for catenary hung conventional steel cables is only about one-half mile or less.

Even when not installed on power transmission line supports, metallic messenger cables should be grounded at each termination and/or supported from insulators for lightning protection. It would be valuable to eliminate the cost and time required to provide and install such protection. Even when grounded, lightning strike currents and fault currents can heat a steel messenger cable sufficiently to melt an outer polymer jacket of a fiber optic cable contacting the steel messenger cable permitting moisture to enter and damage the fiber optic cable.

Typically a metallic messenger cable is hung first from its supports and the fiber optic cable is then lashed to the installed messenger cable with a thin metal wire to avoid damage to the fiber optic cable. It would be of significant value again in terms of time and expense savings, if the messenger cable could be shipped and installed with the fiber optic cable already attached.

Generally speaking, prior polymeric cables (e.g. nylon) have not gained acceptance for use as messenger cables supporting long distance fiber optic cables. Prior polymeric cables have significant initial stretch and significant subsequent creep under load. To prevent breakage of the fiber optic waveguides, significantly longer lengths of fiber optic cable would have to used with given lengths of prior polymeric cables to compensate for this stretch. It would be difficult to attach the much longer fiber optic cable to such prior polymeric messenger cables without severely bending the fiber optic cable and possibly damaging the waveguides. Also, the strength to diameter ratios of such prior polymeric cables made them impractical for spanning long distances. Increasing the diameter of such cables to lengthen their span distance merely subjected such cables to greater wind and ice loads effectively limiting their span distances to less than could be achieved with steel.

Glass rod/epoxy messenger cables have been employed, on occasion, to aerially support the fiber optic cables. Such messenger cables in diameters sufficient for such uses (approximately one quarter inch or more) have limited flexibility and must be mounted on spools of very large diameter which limit the lengths of cable which can be handled. In the only such system known, the fiber optic cables were fixedly suspended below glass rod/epoxy messenger cable on molded connectors fixedly attached to the messenger cable approximately every 18 inches along the messenger cable. Insofar as is presently known, such cable systems have been limited to runs of about one mile or less.

It would be advantageous to be able to provide continuous, non-metal messenger cable lengths of more than one mile, preferably of 10,000 feet or more to reduce the number of messenger cable end terminations which have to be provided and, where the messenger cable is joined with the fiber optic cable before shipment, so that longer fiber optic cable lengths can be shipped and installed as single units.

Many fiber optic cables include an internal, flexible, tension load bearing member. Such tension load bearing members are generally sized for the tensile loads imposed in installing the cable. Such loads might be generated by pulling such a cable through a supporting conduit or by lowering the cable to or raising it from the ocean floor or by aerially suspending relatively short lengths of the cable between adjoining relatively closely supports such as telephone poles. Insofar as is presently known, no fiber optic cable is designed for the tensile and fatigue loads imposed by freely suspending significant lengths of the cable at point locations between pairs of supports spaced hundreds of yards or more apart for the life of the cable as is encountered in cables aerially hung for long distance transmission systems.

SUMMARY OF THE INVENTION

Briefly stated the present invention includes, in one aspect, a method of installing a fiber optic cable system for long distance outdoor transmission comprising the steps of unwinding from a spool a fiber optic cable system including an exposed continuous length of a non-metallic messenger cable having a predetermined tension load bearing strength and joined with a longer, exposed continuous length of a fiber optic cable having a tension load bearing strength less than the predetermined tension load bearing strength and including a plurality of internal fiber optic waveguides, the fiber optic cable being free to move axially along the nonmetallic messenger cable, and suspending the non-metallic messenger cable in catenary curves supporting the fiber optic cable between the spaced outdoor supports.

The invention also includes the other methods of installation as well as methods of preparing such cable systems and the cable systems themselves.

BRIEF DESCRIPTION OF DRAWINGS

The foregoing summary, as well as the following detailed description will be better understood when read in conjunction with the appended drawings. For the purpose of illustrating the invention, there is shown in the drawing embodiments which are presently preferred. However, it is understood that this invention is not limited to the precise arrangements and instrumentalities shown. In the drawings:

FIG. 1 is a diagrammatic view of the joining of non-metallic messenger and fiber optic cables by helically wrapping the latter around the former and winding the combined cable system on a spool;

FIG. 2 is an enlarged view of the wrapped cables from area 2 of FIG. 1;

FIG. 3 is a diagrammatic, cross-sectional view of the cables of FIG. 2 taken along the lines 3—3;

DESCRIPTION OF THE PREFERRED EMBODIMENT

Figure 4:
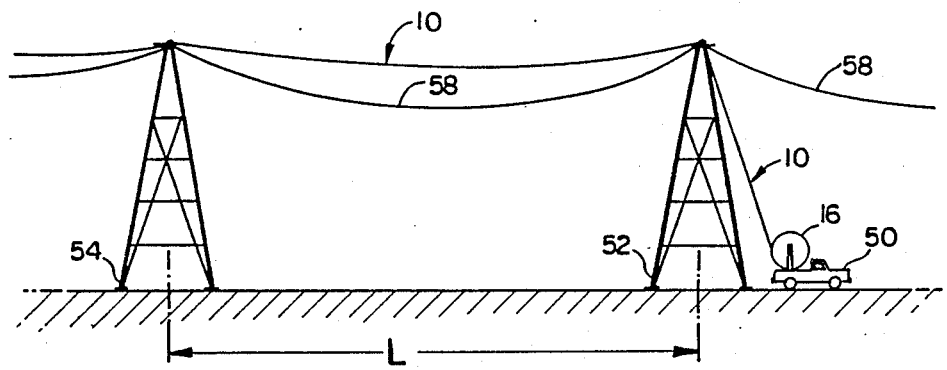
FIG. 4 depicts diagrammatically, the outdoor aerial installation of the fiber optic cable wrapped non-metallic messenger cable system of the subject invention with high voltage current transmission lines on spaced outdoor support towers.

FIG. 1 depicts the fiber optic messenger cable system of the subject invention, indicated generally by the reference numeral 10. An exposed, continuous length of non-metallic messenger cable 14 is joined with a longer, exposed continuous length of fiber optic cable 12 by helically winding the fiber optic cable 12 around the non-metallic messenger cable 14. The fiber optic cable 12 is supported on and by the messenger cable 14 but is free to move axially (and, if necessary, radially) with respect to the messenger cable 14. The continuous lengths of non-metallic messenger cable 14 are joined by helically winding the fiber optic cable 12 around the messenger cable and the resultant cable system 10 is wound around a spool 16 for storage, shipment and/or installation. Individual cables 12 and 14 forming the system 10 are exposed on the spool 16. The term "exposed" is used herein to differentiate the cables 12 and 14 of the subject system 10, which are complete in themselves and individually suitable for outdoor use and installation, from fiber optic cable components which may include an internal tension bearing cable member wrapped with a plastic covered wave guide, or with a thin plastic tube housing a plurality of waveguides, and both covered with a protective outer jacket. Such cables are disclosed, for example, in U.S. Pat. Nos. 4,147,406 and 4,365,865. Preferably, the non-metallic messenger cable 14 is tensioned while being wound with the fiber optic cable 12 so that the continuous length of the fiber optic cable 12 applied is longer than the continuous length of the non-metallic messenger cable 14, even when the latter is fully stretched under tensile load.

Continuous lengths of the preferred, nonmetallic messenger cable 14 of about 40,000 feet have been manufactured. Such lengths of messenger cable 14 can be joined with longer, continuous lengths of fiber optic cable 12 by helically wrapping the latter around the former as described. Joined lengths of cables 12 and 14 forming the system 10 of at least about 20,000 feet each can be wound essentially completely on a single conventional spool 16.

FIG. 2 depicts the preferred for the subject cable system 10. The axial center line 12' of the fiber optic cable 12 forms a pitch angle A with respect to a perpendicular 18 to a center line 14' of the non-metallic messenger cable 14. The pitch angle A for the preferred system being described is at least about 75 degrees to provide only about two (2) percent more fiber optic cable 12 than the preferred, nonmetallic messenger cable 14 per unit length of the cable system 10 when the preferred, non-metallic messenger cable 14 is stretched to essentially its maximum extension under maximum bearable tensile load. Thus, the manner of joining the cables 12 and 14 by helically winding the fiber optic cable 14 around the non-metallic messenger cable 14 not only provide the free axial movement of the fiber optic cable 14 along the messenger cable 12 but also a sufficient extra length of fiber optic cable 14 so that it is not stretched when the messenger cable 12 stretches under load.

The cross sections of the cables 12 and 14 are depicted diagrammatically in FIG. 3. The fiber optic cable 12 can be of virtually any conventional construction. An exemplary fiber optic cable construction useful for aerial suspension, particularly for long distance lines, includes a central rod-like core 20 of plastic reinforced with a plurality of glass fiber filaments which together constitute a tension load bearing member of the fiber optic cable 12. The cable 14 includes a plurality of internal fiber optic waveguides 26 in each of a plurality of plastic tubes 24. The tubes 24 are oscillated around the central core 20 and held to the core 20 by suitable means such as tape (not depicted). Each tube 24 includes up to forty individual fiber optic waveguides 26 loosely packed in the tube 24. Each tube 24 is further filled with a dielectric polymer gel (not depicted for clarity) which supports and protects the waveguides 26. Lengths of thick, plastic rod 28 are provided to at least partially fill the interior of the cable 12. The central core 20 has a greater tension load bearing strength than any or all of the fiber optic waveguides 26 but that strength is still less than the tension load bearing strength of the messenger cable 14. Preferably, the central core 20 and tubes 24 and rods 28 (if provided) are surrounded by an armored sleeve 30 formed of a suitable material such as spiral wrapped aramid fibers. A continuous, unbroken weather-proof outer jacket 32, preferably at least about 0.060 inch thick of extruded polyethylene but possibly another polymer material that holds up well under outdoor exposure (i.e. sun, moisture and temperature extremes), provides a final or outer layer of protection. All voids within the jacket 32 are filled with a dielectric polymer gel for further protection of the waveguides 26. The resulting cable is non-metallic having only dielectric components and is thus non-electrically conductive.

What is meant by "outdoor exposure", is the long-term (years), continuous exposure to weather extremes (moisture and temperature) and sunlight to which such cable systems are exposed when permanently hung outdoors as long distance communication transmission systems.

Non-metallic fiber optic cables suitable for outdoor use may be obtained from any of a variety of sources. The above described cable 12 may be obtained from Siecor in Hickory, N.C. The fiber optic cable 12 described is exemplary and is not limiting of the invention. It is preferred that a non-metallic, dielectric fiber optic cable like the cable 12 be employed to enable the system to be used around electric power lines as will be described.

The preferred, non-metallic messenger cable 14 includes a tension load bearing core 40 formed by a multiplicity of aramid fibers 42, preferably Kevlar brand aramid fibers distributed in the United States by E. I. DuPont, Wilmington, Del. The fibers 42 are generally continuous along the axial length of the cable 14 and are orientated generally parallel to one another and to the axial length of the cable 14 for minimum creep and maximum tensile strength. The parallel aramid fibers 42 are bound together with a binder thread (not depicted), typically nylon. The binder thread and core 40 are surrounded by a protective, continuous, unbroken, weather proof polymer outer jacket 44, again preferably extruded polyethylene, but possible another polymer that holds up well under outdoor exposure. Such aramid fiber cables can be obtained in the United States from United Ropeworks (U.S.A.) Inc., Montgomeryville, Penna. Such cables typically have an outer diameter ranging from about 0.3 to about 1.0 inches, including a 0.060 inch thick extended polyethylene outer jacket and from approximately one hundred to six hundred bundled aramid fiber yarns, each about 0.022 inches in diameter and containing one-thousand, parallel aramid filaments. The tension load bearing strength of the aforesaid United Ropeworks cables range from approximately 6,700 to about 70,000 pounds of tensile load for the indicated diameters. In the system 10, the non-metallic messenger cable 14 always has a predetermined tension load strength greater than the tension load strength of the fiber optic cable 12 with which it is used.

In addition to providing outstanding weather protection, the polyethylene outer jackets on both the fiber optic cable 12 and messenger cable 14 have relatively low coefficients of friction compared to those of conventional steel messenger cables. This permits easier relative movement of the cables with respect to one another, reducing strain on the fiber optic cable 12. This, together with the helical wrapping method of joining the cables 12 and 14, significantly reduces the possibility of fiber optic waveguide breaks.

FIG. 4 depicts diagrammatically the aerial suspension of the cable system 10. As was indicated with respect to FIG. 1, a continuous length of non-metallic messenger cable 14, joined along essentially its entire continuous length with a continuous length of fiber optic cable 12 longer than the continuous length of the non-metallic messenger cable, is wound around a spool 16.

The spool 16 wound with cable system 10 is carried on a suitably configured vehicle 50. The cable system 10 is simply unwound and suspended in catenary curves between spaced, elevated outdoor supports such as towers 52, 54 by suitable brackets too small to be depicted in the figure.

FIG. 4 further illustrates diagrammatically one of the major beneficial aspects of the subject invention. Since the described cable system 10 does not incorporate any -metal or other electrical conductors, the cable system 10 can be suspended from elevated supports 52, 54 also used to support one or more metallic cables 58 adapted for high voltage electric power transmission (i.e. electric power lines). Such adaption is provided, for example, by the mounting of the cable 58 to the supports 52 and 54 by electrical insulators and/or the connection of the cable 58 with an electric power generation source (neither depicted). Indeed, the cable system 10 of the subject invention is safe enough to be strung with high voltage electric power lines 58 in the same plane as those lines as is indicated in FIG. 4. Of course, care should always be exercised in mounting the cable system 10 with other cables to prevent physical contact under various conditions (high temperature, snow, ice and/or wind) and to prevent possible physical contact between the cables which might cause damage to the fiber optic waveguides. The capability to string the system 10 with power lines provides a significant advantage over prior art fiber optic cable systems employing a metallic tension load bearing member. Such systems are not used around power transmissions lines due to the dangers of shorting and grounding and the safety of workers. The ability to use existing rights of way and existing elevated poles or towers gives the subject invention a significant, commercial advantage over to metallic cable systems.

Because they are non-conductive, the preferred cables 12 and 14 need not be insulated from supports or nearby power lines or otherwise grounded for protection against lightning. Nor are fault currents, to which metallic cables are subject, a problem. Moreover, the relatively high decomposition temperature (about 700 degrees F.) of aramid means the preferred messenger cable 14 is less likely to fail than cables employing other polymers in those instances when it might be heated. For example, heating of outdoor aerially hung cable systems might occur from lightning strikes on metallic poles or towers supporting the cable and from ground fires.

The lighter weight of the subject system 10 provides another advantage over steel messenger cable systems. The lighter weight cable system 10 of the subject invention is more easily supported from existing electric power line towers and poles without modification to the towers or poles. Of course, the increased tensile loads imposed by the addition of the subject cable system 10 to existing towers or poles will sometimes necessitate the reinforcement of those towers or poles Such instances will be less frequent than when metallic messenger cables are employed.

As FIG. 4 further indicates diagrammatically, the combined cable system 10 assumes a catenary curve configuration when hung between two spaced elevated supports 52 and 54. The aramid fiber messenger cable 14 of the preferred embodiment is approximately five times stronger than a steel cable of comparable weight. Thus, the cable system 10 of the subject invention can be aerially hung between a pair of supports 52 and 54 separated by a span distance L many times greater than could be spanned by a cable system employing a steel messenger cable. While steel cables are typically limited to a span distance L of less than about one-half mile, an aramid fiber cable of the type employed in the present can span a distance several times greater (theoretically almost five times greater). Thus, the subject cable system 10 can be used to span rivers, canyons and other natural obstacles where the provision of a support at approximately every one-half mile or less would either be cost prohibitive or physically impossible.

While the preferred method of installation is to spiral wind the fiber optic cable 12 around the non-metallic messenger cable 14, and wind the combined cables of the system 10 together around the single spool 16 for ease of shipment, handling and installation, it is also conceivably possible to use the preferred cable system by joining the aramid fiber messenger cable of the preferred embodiment with the fiber optic cable at the installation site and then suspending the messenger cable between spaced supports. Alternately, the cable system of the subject invention might be employed by first installing the aramid fiber messenger cable of the preferred embodiment then joining the fiber optic cable to it. While the resulting installations might be satisfactory, neither is as cost effective or simple as joining the cables at a single manufacturing site and shipping them joined, on a single spool to the installation site where they are simply unwound and hung.

It is suggested that the end of the messenger cable 14 be terminated to a support like supports 52, 54 or to some other suitable, fixed, tension load-bearing structure by means of a terminal connector. Such connectors are sold under the name, Spelter sockets, by Crosby-Lockland, Tulsa, Oka. The fiber optic cable 12 can be terminated in any desired conventional manner, such as by splicing with another continuous length of fiber optic cable, junction with a fiber optic signal repeater, or junction with a fiber optic wave guide terminal device, etc.

Figure 5:
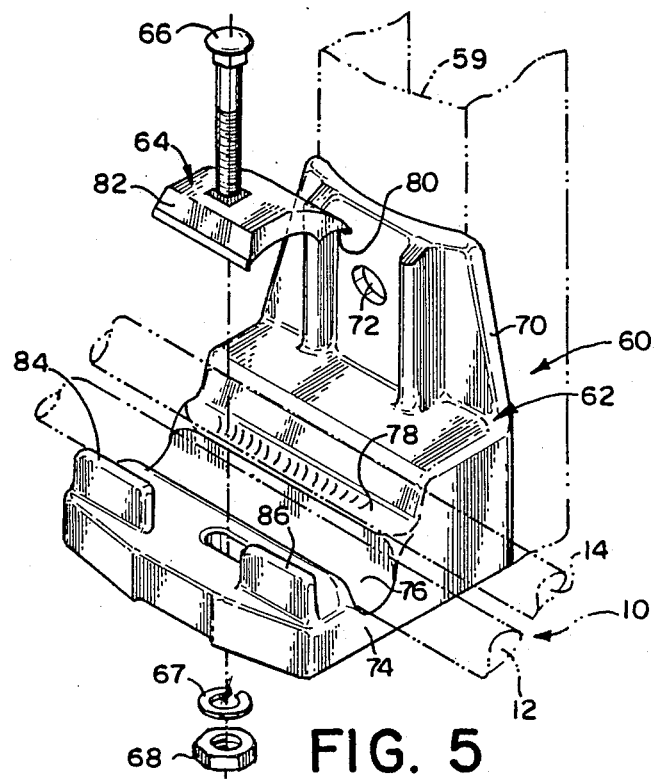
FIG. 5 is a perspective view of a bracket supporting an intermediate portion of a continuous length of the non-metallic messenger cable wrapped with a fiber optic cable.

FIG. 5 depicts a suggested bracket 60 for supporting the cable system 10 by a central portion of the non-metallic messenger cable 14. The bracket 60 includes a support member 62 and a clamp 64. The clamp 64 is held to the support member 62 by a bolt 66, lock washer 67 and nut 68. The support member 62 includes a generally vertically extending arm 70 having a hole 72 therethrough to enable the support member 62 to be fastened to a support such as a power transmission pole or tower represented by a support member 59, indicated in phantom. Integrally formed with the vertically extending arm 70 is a generally horizontally extending base 74 including a pair of generally parallel cylindrical grooves 76 and 78 on an upper surface of the base 74. A lower surface of the clamp 64 is provided with a curved surface 80 sized and positioned to receive and grip the outer polymer jacket 44 of the non-metallic messenger cable 14 within the groove 78 of the support member 62. In this way, intermediate portions of the messenger cable 14 are fixedly clamped to a support receiving the bracket 60. The fiber optic cable 12 of the system 10 is draped across the groove 76 of the support member 62 but is not clamped by the clamp 64 to prevent possible damage to the waveguides within the cable 12 and to permit the fiber optic cable 12 to move axially with respect to the messenger cable 14 at each support 60. A tongue 82 of the clamp 64 is received between a pair of spaced, substantially vertical legs 84 and 86 extending up along a front edge of the base 74 to prevent rotation of the mating clamp 64 relative to the base 74. The legs 84 and 86 also assist in keeping the cables 12 and 14 on the base 74 before the clamp 64 is mounted.

Another advantage of the preferred cable system 10 is indicated by inference from FIG. 5. Prior art steel messenger cable systems and single fiber optic cable systems supported by an internal, tension load bearing member, required dampening to prevent damage from vibration induced by wind, tension, etc. No such problem occurs in the subject invention. The harmonic resonant frequency of the suggested preferred fiber optic cable 12 is different from those of the preferred aramid core messenger cables 14. Vibrations induced in the two cables 12 and 14 therefore tend to cancel each other.

It will be appreciated by those skilled in the art that other modifications could be made to the illustrated and described embodiment without departing from the scope of the invention. All such modifications which fall within the scope of the appended claims are intended to be covered thereby.

I claim:

1. A method of installing a fiber optic cable system for long distance outdoor transmission comprising the steps of:

unwinding from a spool a fiber optic cable system including an exposed continuous length of a non-metallic messenger cable having a predetermined tension load bearing strength and joined with a longer, exposed continuous length of fiber optic cable having a tension load bearing strength less than the predetermined tension load bearing strength and a plurality of internal fiber optic waveguides and free to move axially along the non-metallic messenger cable; and suspending the non-metallic cable between spaced outdoor supports in catenary curves supporting the fiber optic cable.

2. The method of claim 1 wherein said suspending step further comprises installing the non-metallic messenger cable between spaced outdoor supports also supporting a metallic cable adapted for high voltage electric power transmission.

3. The method of claim 1 wherein a pair of the adjoining supports are spaced more than about one-half mile apart.

4. The method of claim 1 wherein the suspending step further comprises fixedly clamping continuous, intermediate portions of said non-metallic messenger cable with each of a plurality of said supports and separately supporting the fiber optic cable from said messenger cable at each of the plurality of supports to permit axial movement of the fiber optic cable with respect to each of said supports and the non-metallic messenger cable.

5. A method of installing a fiber optic cable system for long distance outdoor transmission comprising the steps of:

joining an exposed, continuous length of a non-metallic messenger cable having a predetermined tension load bearing strength with a longer, exposed continuous length of a fiber optic cable including a plurality of internal fiber optic waveguides for free axial movement of the fiber optic cable along the non-metallic messenger cable; and suspending the non-metallic messenger cable between spaced outdoor supports in catenary curves supporting the joined fiber optic cable.

6. The method of claim 5 wherein said joining step comprises helically winding the fiber optic cable around the non-metallic messenger cable.

7. A method of manufacturing a fiber optic cable system for outdoor long distance transmission installation comprising the steps of:

joining an exposed continuous length of non-metallic messenger cable having a predetermined tension load bearing strength with a longer exposed continuous length of fiber optic cable including a plurality of internal waveguides and having a tension load bearing strength less than the predetermined tension load bearing strength of the non-metallic messenger cable for free movement of the fiber optic cable axially along the non-metallic messenger cable; and winding essentially all of the nonmetallic messenger cable and joined fiber optic cable around a spool.

8. The method of claim 7 wherein said joining step comprises helically winding the fiber optic cable around the non-metallic messenger cable.

9. The method of claim 7 wherein said non-metallic messenger cable has an aramid fiber cable as a tension load bearing core.

10. A cable system comprising:

an exposed continuous length of non-metallic messenger cable having an aramid fiber cable, tension load bearing core encased in an outer polymer jacket adapted for outdoor exposure, the messenger cable having a predetermined tension load bearing strength; and an exposed fiber optic cable including a plurality of fiber optic waveguides within an outer polymer jacket adapted for outdoor exposure and having a continuous length longer than the continuous length of the non-metallic messenger cable and a tension load bearing strength less than the predetermined tension load bearing strength, the fiber optic cable being joined with the non-metallic messenger cable for free movement of the fiber optic cable along the length of the non-metallic messenger cable.

11. The cable system of claim 10 further comprising a spool wound with the joined, continuous lengths of the non-metallic messenger cable and the fiber optic cable.

12. The cable system of claim 10 wherein the fiber optic cable is helically wound around the non-metallic messenger cable.

13. The cable system of claim 10 wherein the fiber optic cable is non-metallic.

14. The cable system of claim 10 wherein the continuous length of the non-metallic messenger cable is at least about 20,000 feet.

15. The cable system of claim 14 wherein the continuous length of the non-metallic messenger cable is at least about 40,000 feet.

16. The cable system of claim 10 wherein at least a portion of the non-metallic messenger cable wrapped with the fiber optic cable is hung in catenary curves between spaced supports.

17. The cable system of claim 16 wherein one of the catenary curves extends between a pair of the supports spaced greater than about one-half mile apart.

18. The cable system of claim 16, wherein at least a portion of the non-metallic messenger cable wrapped with the fiber optic cable is hung between supports further supporting a metallic cable adapted for high voltage electric power transmission.

19. The cable system of claim 16 wherein said non-metallic messenger cable is fixedly secured to said supports while said fiber optic cable remains free to move axially with respect to said messenger cable at the support.

20. In a high voltage electric power transmission system, including a multiplicity of spaced, elevated and one or more continuous metallic cables hung above the ground from each of the multiplicity of spaced metal towers and adapted for electric power transmission improvement comprising:

an exposed continuous length of non-metallic messenger cable suspended in catenary curves between adjoining pairs of the multiplicity of metal towers, the messenger cable having an aramid fiber cable, tension load bearing core encased in a polymer outer jacket adapted for outdoor exposure; and an exposed continuous length of non-metallic fiber optic cable having a polymer outer jacket adapted for outdoor exposure and supported by the non-metallic messenger cable for free axial movement along the non-metallic messenger cable between the pairs of metal towers.

21. The improvement of claim 20 wherein each of the continuous lengths of non-metallic messenger cable and fiber optic cable is more than about ten thousand feet.

22. The improvement of claim 20 wherein at least a portion of said continuous length of the non-metallic messenger cable is suspended in a catenary curve between a pair of the elevated metal towers space more than one-half mile apart.

23. The improvement of claim 20 wherein intermediate portions of the non-metallic messenger cable are fixedly clamped to the metal towers and intermediate portions of the fiber optic cable at the metal towers remain free to move axially with respect to the clamped, non-metallic messenger cable at the metal towers.

24. The method of claim 1 wherein the non-metallic messenger cable has an aramid fiber cable, tension load bearing core encased in an outer polymer jacket adapted for outdoor exposure.

25. The method of claim 24 wherein the fiber optic cable on the spool is helically wound along the messenger cable on the spool.

26. The method of claim 6 wherein the non-metallic cable has an aramid fiber cable, tension load bearing core encased in an outer polymer jacket adapted for outdoor exposure.

27. The method of claim 26 wherein the joining step further comprises the step of tensioning the non-metallic messenger cable while winding the messenger cable with the fiber optic cable so that the continuous length of the fiber optic cable applied is longer than the continous length of the non-metallic messenger cable even when the latter cable is fully stretched under tensile load.

28. The method of claim 27 wherein the winding step comprises wrapping the fiber optic cable around the messenger cable at pitch angle providing about two percent more fiber optic cable than messenger cable per unit length of the messenger cable when the messenger cable is stretched to essentially its maximum extension under tensile load.

29. The method of claim 26 wherein the messenger cable has a continuous unbroken length of at least 10,000 feet.

30. The cable system of claim 12 wherein the fiber optic cable is wrapped around the messenger cable at a pitch angle providing about two percent more fiber optic cable than messenger cable per unit length of the messenger cable when the messenger cable is stretched to essentially its maximum extension under tensile load.

31. The cable system of claim 10 wherein the non-metallic messenger cable is at least 10,000 feet in length.

* * * * *